United States Patent
Albery

[19]

[11] Patent Number: 5,454,167
[45] Date of Patent: Oct. 3, 1995

[54] PORTABLE SAWS

[76] Inventor: William Albery, 8 Delamere Road, Gatley, Cheshire SK8 4PH, England

[21] Appl. No.: 188,782

[22] Filed: Jan. 31, 1994

[30] Foreign Application Priority Data

Jul. 31, 1991 [GB] United Kingdom ............. 9116547

[51] Int. Cl.⁶ .................................................. B23D 47/02
[52] U.S. Cl. .................................................. 30/377; 30/374
[58] Field of Search ........................ 30/374–377, 388, 30/390, 391; 83/743, 745, 829

[56] References Cited

U.S. PATENT DOCUMENTS 4,078,309  3/1978  Wilson ................................ 30/375

FOREIGN PATENT DOCUMENTS

| 0058775 | 7/1983 | European Pat. Off. . |
| 2006107 | 5/1979 | United Kingdom . |
| 2071009 | 3/1981 | United Kingdom . |
| 2059338 | 4/1981 | United Kingdom . |
| 2258188 | 2/1993 | United Kingdom . |

*Primary Examiner*—Douglas D. Watts
*Attorney, Agent, or Firm*—Dennison, Meserole, Pollack & Scheiner

[57] ABSTRACT

The saw comprises a cased motor driving a circular saw blade that is pivotally mounted to a baseplate to vary the cutting extension below the baseplate. A channel-shaped part that is of smaller cross-section than an open slot in the baseplate is used for guiding the baseplate during a cutting operation over a worktable by abutment against or location over an upstanding guide located on the worktable. The channel-shaped part is medially pivoted to the baseplate and its angle thereto is adjusted by way of a cam so as to vary the angle of the baseplate, and hence of the saw blade, relative to the direction of travel, thereby to permit the production of a width of cut greater than the width of the saw blade.

25 Claims, 2 Drawing Sheets

PORTABLE SAWS

TECHNICAL FIELD

This invention relates to portable saws of the kind comprising a circular saw blade driven by a cased motor which is mounted pivotally relative to a baseplate so that cutting extension of the saw blade below the base plate is variable according to desired cutting of a workpiece, including depth of cutting a slot in that workpiece.

BACKGROUND ART

Customarily, the cased motor extends sideways from the saw blade and carries a handle by which the portable saw is pushed along a worktable in cutting a workpiece. The handle is normally alongside a guard over the upper part of the saw blade.

My British Patent No. 2096942 discloses such a portable saw in which the baseplate is bodily movable on a bedplate to produce a slight angle of the saw blade relative to its direction of travel and required direction of cut in the workpiece, thus vary the width of a slot then scribed into the workpiece. Such a portable saw is particularly advantageous and economic in cutting decoratively faced boards using a first traverse in one direction with the saw blade slightly angled to scribe a slot of slightly greater width than a normal saw cut and a second traverse in the opposite direction with the saw blade unangled and lowered to cut through the board so its cut comes through the scribed slot without danger of chipping the surface at edges of the saw cut.

In even earlier arrangements, disclosed in my British Patents Nos. GB 2059338 and GB 2071009, variation in the angle of the saw blade relative to the direction of travel/cut of the saw is achieved by pivoting of mounting brackets for the saw motor relative to the baseplate so that the angle of the saw blade relative to the baseplate is varied. The saw in GB 2096942 (mentioned above) required relative movement of two plates achieved by cam means at one side of those plates; it also had an arm movable manually at the same side of those plates for setting the depth of a scribing cut and for permitting transitions from scribing to fuller depth of cut. It has no provision for making bevel cuts.

OBJECT OF THE INVENTION

This invention aims to improve on the portable saws of my earlier British patents in several respects.

SUMMARY OF THE INVENTION

According to this invention there is provided a portable saw wherein the baseplate has associated therewith a lesser elongate part pivoted to the baseplate for angling relative thereto in setting a scribing angle of the saw blade during traverses using said lesser elongate part angled for guidance purposes.

For a worktable with an elongate upstanding guide, the lesser elongate part may be of downwardly open channel-section corresponding to the upstanding guide, and may extend substantially the full length of the baseplate, conveniently in a wider downwardly open slot within the thickness of the baseplate and accommodating angling of the lesser elongate part within its width. An advantageous angling mechanism comprises an eccentric cam rotatable on the lesser elongate part and acting against sides of an upper slot in the baseplate. Such eccentric cam may be lever operated, then preferably with the lever carrying an adjustable abutment for setting depth of scribing cut as a stop to pivoting of the motor and saw blade. The baseplate may further have an adjustable abutment for said lever so that the angle of scribing cut can be adjusted.

Advantageously, means for setting a scribing angle of the saw blade may include a linkage operable by a trigger actuated by an operator's finger or thumb while holding the portable saw by its handle. It is particularly convenient to accomplish this by use of a so-called Bowden (Registered Trade Mark) cable so that the trigger operates said cam, preferably by moving said lever so the first mentioned said abutment comes into a position setting depth and width of scribing cut.

Other features of the saw include a two-part baseplate of which an upper part carrying pivoted mounting of the motor unit is hinged for tilting on a lower part for setting saw blade bevel angles; and/or depth of cut setting at least other than for scribing by way of a clamp for pivoting of the motor unit on the baseplate and operated by way of a trigger actuated by one digit of an operator's hand while holding the portable saw by its handle.

Combining the latter feature with the aforesaid trigger-operated linkage conveniently permits different digits to operate the different triggers.

BRIEF DESCRIPTION OF THE DRAWINGS

Specific implementation of this invention and its various aspects and features is now described, by way of example, with reference to the accompanying drawing, in which:

FIG. 4 is a detail of saw cut depth setting means.

DETAILED DESCRIPTION OF PREFERRED ILLUSTRATED EMBODIMENT

Figure 1:
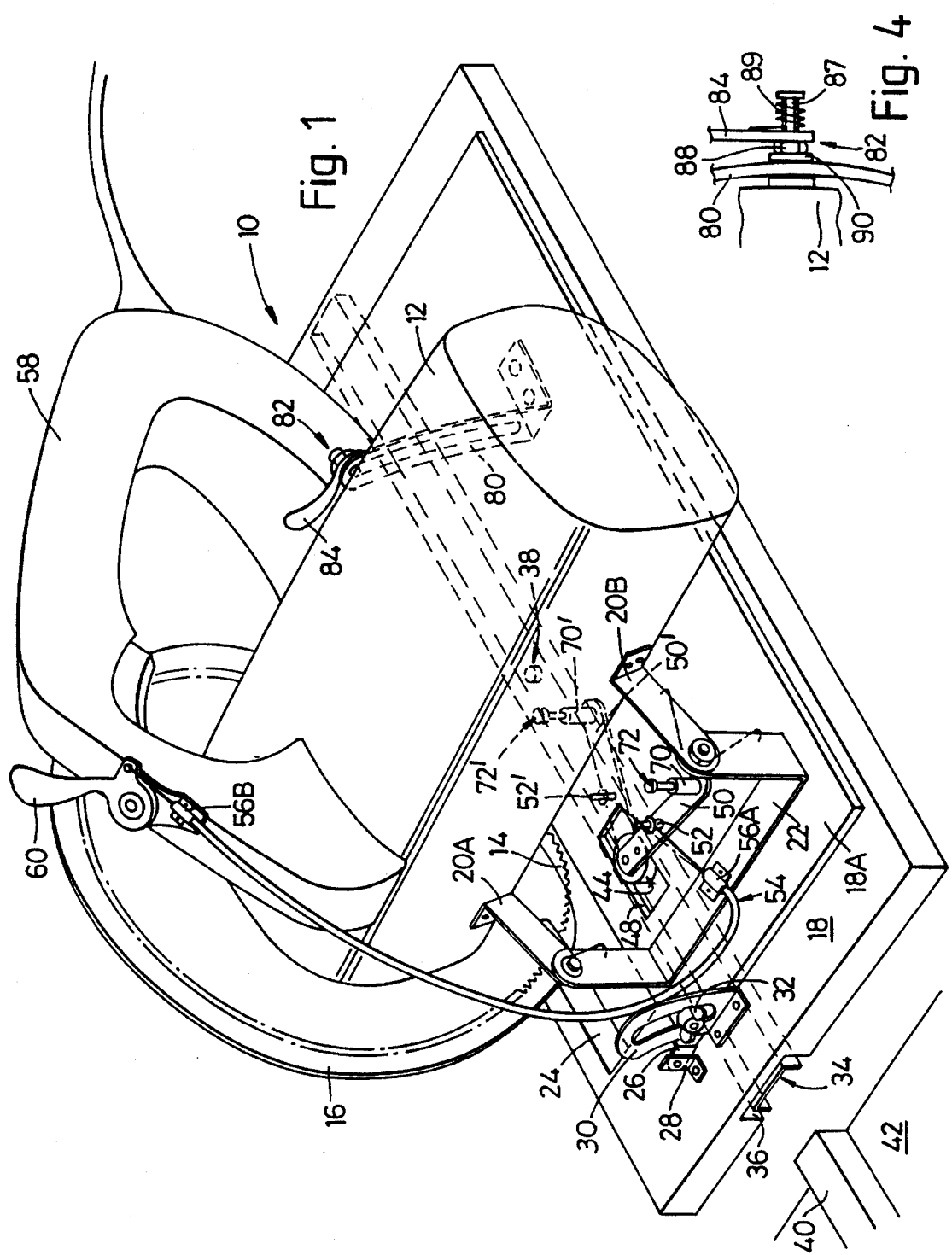
FIG. 1 is a perspective view of a portable saw.
Figure 2:
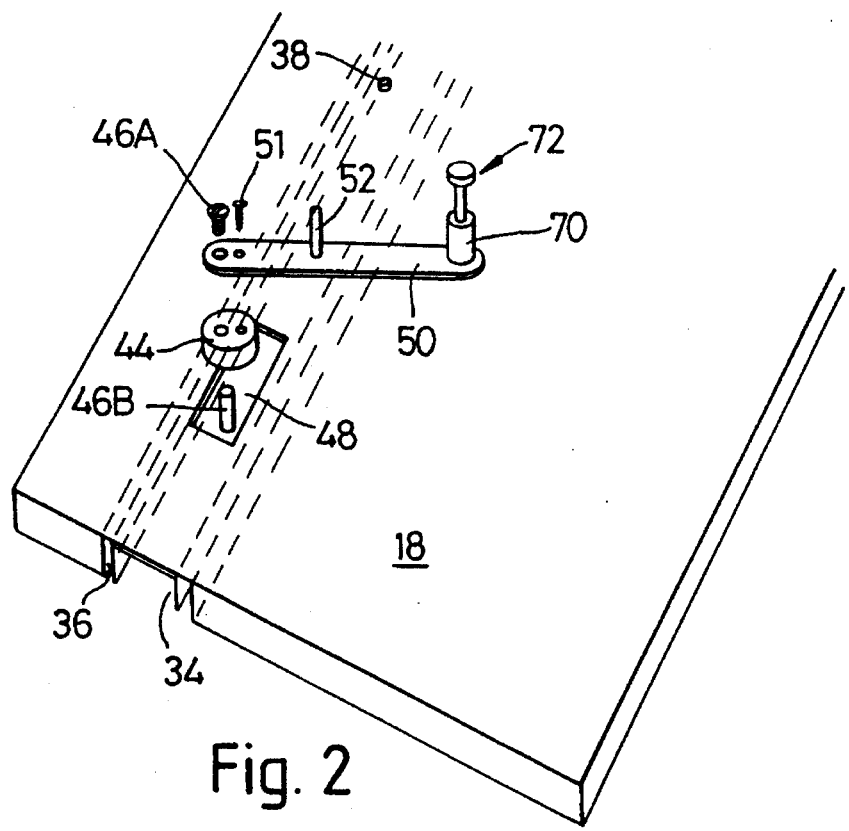
FIG. 2 is an exploded view of parts of a scribe angle setting mechanism.

In the drawing, a portable saw 10 comprises a motor casing 12 extending away from a saw blade 14 rotatable by the motor within an upper guard 16 and downwardly projecting through a baseplate 18. The motor casing 12 is hinged to the baseplate 18, actually to an upper part 18A thereof itself hinged to the lower or main baseplate part 18. Hinging of the motor casing 12 is shown by way of spaced brackets 20A, B and a U-shaped bracket 22 on the upper baseplate part 18A, to give a hinge axis parallel with the axis of rotation of the motor and saw blade 14, and enable variation of depth of cut of the saw blade 14 by varying its projection below the base plate 18 through aperture 24. Hinging of the upper baseplate part 18A is on an axis at right angles to normal blade rotation by way of ears 26 and brackets 28 at each end of the upper part 18A (one only shown) and located to facilitate angles of bevel cuts to be set, see arcuate slotted bracket 30 and set screw nut 32.

The baseplate 18 has a lesser elongate part 34, shown as of downwardly open channel-section set in a wider downwardly open slot 36 of the baseplate 18, and extending the full length of the baseplate 18. The lesser elongate part 34 is medially pivoted to the baseplate 18 at 38 near the center line of the motor spindle and close to the blade as is appropriate and advantageous, and can be adjusted through a small angle relative to the baseplate 18. The illustrated downwardly open channel-section of the lesser elongate part 34 fits on upstanding guide 40 of a worktable 42 for guided traverse in cutting a workpiece. Angling the lesser elongated part 34 will correspondingly angle the saw blade 14 and thus secure a slightly wider than normal cut in the workpiece concerned.

Adjustment of the angle of the lesser elongate part 34 is shown by way of a cam 44 shown circular and eccentrically journalled at 46 to the top of the elongate lesser part 34. The cam 34 projects through an upper slot 48 in the baseplate 18. The slot 48 has a width corresponding to the diameter of the circular cam 44 and, both being spaced from the pivot 38, secures angling of the lesser elongate part 34 relative to the baseplate 18 when the cam 44 is rotated. Rotation of the cam 44 is done by swinging an arm 50 shown secured thereto at one end by both of one screw 51 and another screw 46A for a sleeve 46B of the eccentric cam pivot 46. For swinging the arm 50, an anchorage 52 is shown as an upstanding pin spaced from securement of the arm 50 to the cam 44 and holds one end of the inner of a Bowden cable 54 having its outer anchored 56A,B between the baseplate 18, actually the bracket 22 of the upper baseplate part 18A, and a handle 58 secured to the motor casing 12. The inner of the Bowden cable 54 is operable to swing the arm 50 by a trigger 60 on the handle 58 shown conveniently located for movement by an operator's thumb or finger.

Angling of the cam 44 thus the saw blade is shown adjustable by a slidable and settable abutment 60' shown near the free end of the arm 50. As shown, the abutment 60 is a slotted plate movable on a guide screw 62 and a spaced set screw 64 (both into the baseplate 18A relative to markings 66 on the top of the baseplate 18A. Also shown at the same free end of the arm 50 is an upstanding post 70 and screw 72 adjustably projecting from its end as an abutment for the motor casing 12 in setting a depth for saw cutting when the lesser elongate part 34 is set to a desired angle, see dashed in FIG. 1 and primed references. It will be appreciated that both of angling the lesser part 34 (thus the saw blade 14) and depth of saw blade cut affect width of that cut.

Figure 3:
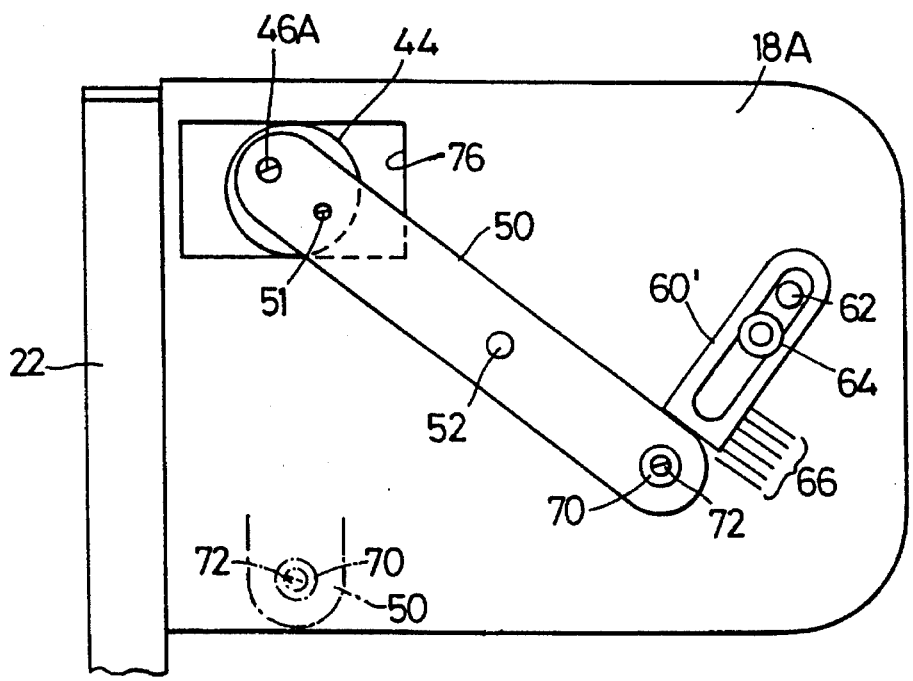
FIG. 3 is a further detail plane view of that scribe angle setting mechanism.

As indicated in FIG. 3, all of the abutment adjustment is preferably accessible through a cut-out 76 in the upper baseplate part 18A, particularly with the motor casing raised to its maximum in the hinging of brackets 20,22. Control of that hinging in terms of setting its height, thus the depth of saw-cut is by way of an arcuate slotted member 80 upstanding from the upper baseplate part 18A and shown equipped with a clamp 82 that is operated by another trigger 84.

FIG. 4 shows the clamp mechanism 82 having a threaded stud 87 extending from the motor casing 12 through the slot in the upstand 80, say from the head of a bolt secured to the motor casing 12. The trigger 84 has a fixed nut 88 with its threads engaging the threaded stud 87 to move outwardly along it when the trigger 84 is operated, but to return under action of spring 89 when the trigger 84 is released. The trigger 84 is curved to facilitate quick action and release. A clamp washer 90 is preferably toothed to mate with toothing of the upstand 80 in setting any desired depth of cut position. The trigger 84 is also adjacent the handle 58 for actuation by an operator's finger, indeed so that both it and the first trigger can be operated by different digits of the same hand, even simultaneously.

I claim:

1. In a portable saw including a baseplate, a cased motor having a circular saw blade connected thereto and driven thereby, said motor being mounted pivotally relative to said baseplate so that a cutting extension of the saw blade below said base plate is variable according to a desired depth of cutting, and wherein an upstanding guide means is provided on top of a worktable as a guide for traverse cutting of a workpiece, the improvement comprising an elongate member connected to said baseplate to act as guide in the movement of said baseplate across said worktable by abutment against said guide means, said elongate member is pivotally connected to the baseplate and adjustable in its angle relative thereto so as to vary the angle of the baseplate, and hence of the saw blade relative to the direction of travel and desired direction of cut thereby to permit production of a width of cut greater than the width of the saw blade.

2. A saw as set forth in claim 1, wherein the elongate member is in the form of a downwardly open channel-section.

3. A saw as set forth in claim 1, wherein the elongate member extends substantially the full length of the baseplate.

4. A saw as set forth in claim 1, wherein the elongate member is accommodated in a downwardly open slot within the thickness of the baseplate said slot being wider than the width of the elongate member.

5. A saw as set forth in claim 1, wherein the pivotable connection of the elongate member to the baseplate is disposed in the middle region of the member and substantially midway along the baseplate in the intended direction of travel of the saw.

6. A saw as set forth in claim 1, wherein, for angling of the elongate member relative to the baseplate, a slot is provided in said baseplate and an eccentric cam, which is rotatable on the elongate member, acts against sides of said slot.

7. A saw as set forth in claim 6, wherein the eccentric cam is lever operated.

8. A saw as set forth in claim 7, wherein the lever carries an adjustable abutment which acts as a stop to pivoting of the motor and hence the saw blade in setting the depth of a cut.

9. A saw as set forth in claim 7, wherein an adjustable abutment for the lever is provided on the baseplate so that the angle of the saw blade relative to the direction of travel can be adjusted.

10. A saw as set forth in claim 7, wherein the saw has a handle and a trigger on said handle and the lever is connected by a Bowden cable to said trigger and is thereby moveable upon actuation of said trigger.

11. A saw as set forth in claim 1, wherein the baseplate comprises two parts, an upper part, to which the motor is pivotally mounted, and a lower part to which said upper part is hinged for tilting relative thereto for setting the saw blade at an angle for bevel cutting.

12. A saw as set forth in claim 1, wherein an elongate slotted guide element is provided, upstanding from said baseplate, and a clamp for releasably engaging said guide element is provided on the cased motor whereby adjustable pivoting of the motor relative to the baseplate, for depth of cut setting at least other than for scribing, is achieved.

13. A saw as set forth in claim 12, wherein the clamp is releasable by manual actuation of a further trigger.

14. In a portable saw including a baseplate, a cased motor having a circular saw blade connected thereto and driven thereby, said motor being mounted pivotally relative to said baseplate so that a cutting extension of the saw blade below said baseplate is variable according to a desired depth of cutting, and wherein an upstanding guide means is provided on top of a worktable as a guide for traverse cutting of a workpiece, the improvement comprising an elongate member in the form of a downwardly open channel connected to said baseplate to act as guide in the movement of said baseplate across said worktable by abutment against said guide means, said elongate member is pivotally connected to the baseplate and adjustable in its angle relative thereto so as to vary the angle of the baseplate, and hence of the saw blade relative to the direction of travel and desired direction of cut thereby to permit production of a width of cut greater than the width of the saw blade.

15. A saw as set forth in claim 14, wherein the elongate member extends substantially the full length of the baseplate.

16. A saw as set forth in claim 14, wherein the elongate member is accommodated in a downwardly open slot within the thickness of the baseplate said slot being wider than the width of the elongate member.

17. A saw as set forth in claim 14, wherein the pivotable connection of the elongate member to the baseplate is disposed in the middle region of the member and substantially midway along the baseplate in the intended direction of travel of the saw.

18. A saw as set forth in claim 14, wherein, for angling of the elongate member relative to the baseplate, a slot is provided in said baseplate and an eccentric cam, which is rotatable on the elongate member, acts against sides of said slot.

19. A saw as set forth in claim 18, wherein the eccentric cam is lever operated.

20. A saw as set forth in claim 19, wherein the lever carries an adjustable abutment which acts as a stop to pivoting of the motor and hence the saw blade in setting the depth of a cut.

21. A saw as set forth in claim 19, wherein an adjustable abutment for the lever is provided on the baseplate so that the angle of the saw blade relative to the direction of travel can be adjusted.

22. A saw as set forth in claim 19, wherein the saw has a handle and a trigger on said handle and the lever is connected by a Bowden cable to said trigger and is thereby moveable upon actuation of said trigger.

23. A saw as set forth in claim 14, wherein the baseplate comprises two parts, an upper part, to which the motor is pivotally mounted, and a lower part to which said upper part is hinged for tilting relative thereto for setting the saw blade at an angle for bevel cutting.

24. A saw as set forth in claim 14, wherein an elongate slotted guide element is provided, upstanding from said baseplate, and a clamp for releasably engaging said guide element is provided on the cased motor whereby adjustable pivoting of the motor relative to the baseplate, for depth of cut setting at least other than for scribing, is achieved.

25. A saw as set forth in claim 24, wherein the clamp is releasable by manual actuation of a further trigger.

* * * * *